Dec. 12, 1933.  A. F. SULZER  1,939,239
MOTION PICTURE APPARATUS
Filed Dec. 31, 1929
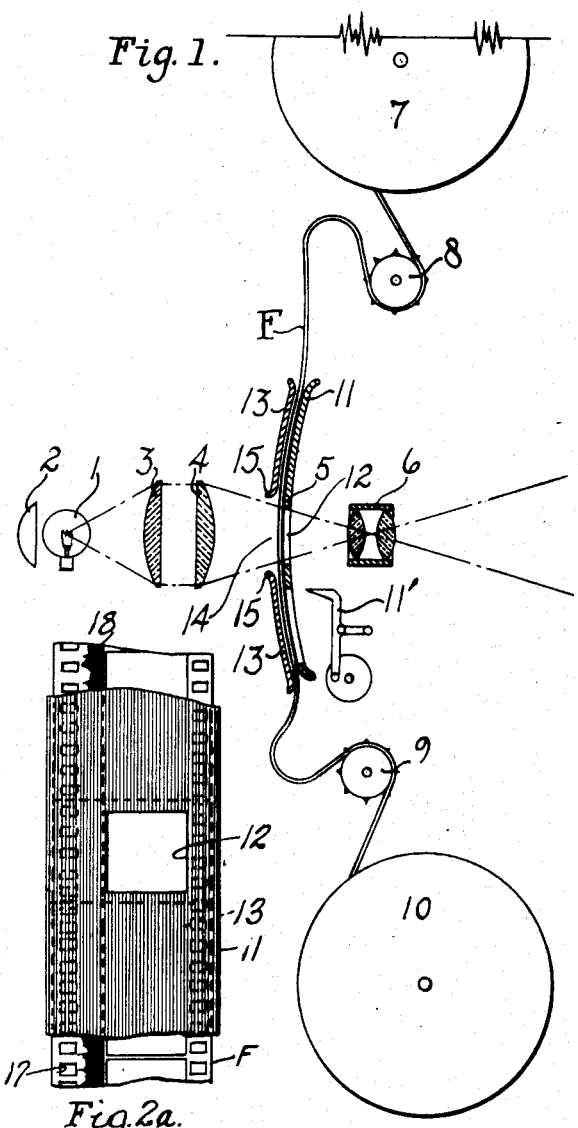
Fig. 1.
Fig. 2a.
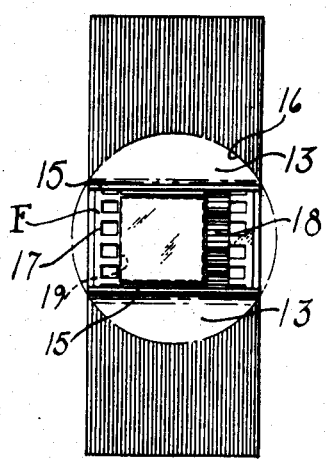
Fig. 2.
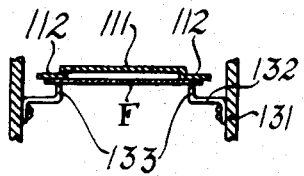
Fig. 4.
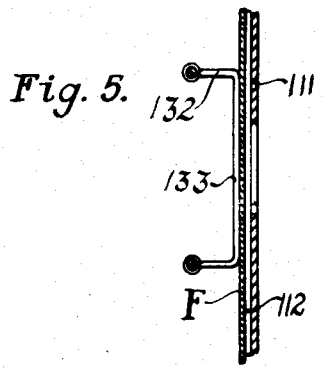
Fig. 5.
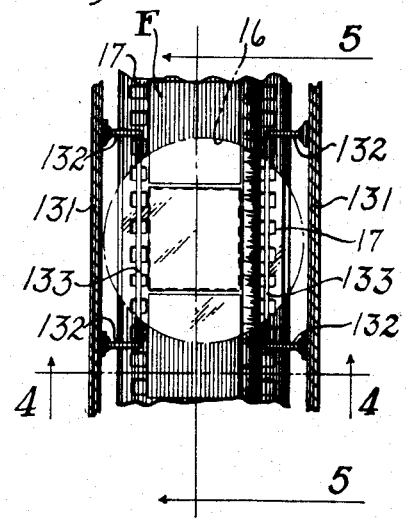
Fig. 3.
Albert F. Sulzer, Inventor
By *Newton M. Perrine, Donald H. Stewart*
Attorneys Patented Dec. 12, 1933

1,939,239

UNITED STATES PATENT OFFICE 1,939,239

MOTION PICTURE APPARATUS

Albert F. Sulzer, Rochester, N. Y., assignor to Eastman Kodak Company, Rochester, N. Y., a corporation of New York Application December 31, 1929
Serial No. 417,654

7 Claims. (Cl. 88—17)

This invention relates to photography, and more particularly to photographic apparatus in which film is passed through a projected light beam. One object of my invention is to provide photographic apparatus with a means for preventing film from wrinkling due to heat. Another object of my invention is to provide a projector with a film gate across which a film to be projected may be drawn for supporting the film in position to receive a portion of the light beam used to project a picture. Other objects will appear from the following specifications, the novel features being particularly pointed out in the claims at the end thereof.

Coming now to the drawing wherein like reference characters denote like parts throughout:

Figure 1 is a schematic view showing partially in elevation and partially in section a motion picture projector constructed in accordance with and embodying a preferred form of my invention.

Figure 2 is an enlarged detail of the film gate used with the apparatus shown in Figure 1.

Figure 2a is an enlarged fragmentary detail of the reverse side of the film gate shown in Figure 2.

Figure 3 is an enlarged view showing a film gate in another embodiment of my invention.

Figure 4 is an enlarged detail section on line 4—4 taken in Figure 3, and

Figure 5 is an enlarged detail section on line 5—5 of Figure 3.

I have found that in motion picture apparatus where an unsymmetrically located portion of a film band is subjected to considerable heat, that the band sometimes wrinkles slightly and is caused to move away from its normal path. This is particularly true of the new wide film used particularly for making sound and picture records on the same film. Where this occurs a portion of the film only is used for projecting the picture record and the remainder of the film is usually masked off by means of a plate with an off-set aperture to be protected from heat.

While it is desirable to keep the film as cool as possible in projection, it is also desirable to have the entire film width heated or cooled evenly because if an unsymmetrically located portion of the film band is heated to a much greater extent than the remainder of the film band, the film frequently buckles away from the plane in which it should lie in the projecting machine and thus proper projection is prevented.

I have found that by constructing a projecting machine in such a manner that the entire width of the film band can be simultaneously subjected to a light beam, that this buckling is prevented.

With the apparatus shown in Figure 1, a preferred form of my invention is shown. The projector may be of any well-known type in which there is a lamp 1 mounted in front of a reflector 2 so that most of the light emanating from the lamp will be directed forwardly in a beam by means of the condensing lenses 3 and 4. This beam is adapted to pass a film gate designated broadly as 5 and an objective 6 which throws an image of the picture at the film gate upon the screen.

Film may be drawn from a supply spool 7 over a feed sprocket 8 through the film gate 5 over a second feed sprocket 9 and on to a take-up reel 10. The film is moved intermittently, one frame at a time, by means of a pull-down mechanism 11' which may be of any desired type and which is here shown as the claw type.

The film gate designated broadly by 5 consists of a plate 11 having an off-set aperture 12, see Figure 2a, of approximately the size of a single picture frame on motion picture film. Opposite to plate 11 is a second plate 13 which is cut away in the center at 14, leaving an opening throughout the entire width of the film.

The edges of the plate 13 are formed outwardly a short distance as indicated at 15 so that the film F may pass freely between plates 11 and 13 of the film gate.

From Figure 2 it should be noted that the film F has its entire width exposed to the light beam coming from the lamp 1, and at this point the light beam is circular in form, as indicated by the dot-and-dash line at 16 in Figure 2. However, the edges 15 of the inner film gate member 13 are parallel so that an even width of the film is exposed to this light beam at one time.

The film F is provided with the usual perforations 17 by which the film may be moved, is provided with a sound record 18 which may be of any usual type and is provided with an exposure area unsymmetrically located on the film and indicated in dotted line at 19. This film may be the standard 35 mm. film provided with both a sound and picture record, or it may be one of the wider films such as the 75 mm. film which is sometimes used for sound record work. It is not material just what the width of the film actually is so long as the entire width of the film is exposed to the light beam which will evenly heat all parts of the exposed film.

From Figure 2a it should be noted that only the picture record of the film F is available for projection by the objective 6, the off-set aperture 12 in plate 11 permitting light to be transmitted to the objective through the picture record which is unsymmetrically located on the film F. The remainder of the film F at the gate, including rows of perforations 17 and the sound record 18, is masked off by the plate 11.

Where a curved film gate 5 is used as shown in Figure 1 it is not necessary to have any part of the film gate pressing directly on that part of the film F which overlaps the off-set aperture 12 in plate 11. For some purposes, however, it is desirable to use a flat gate, and in case such a gate is used, the structure shown in Figure 3 may be employed. Here the back member of the film gate comprises side walls 131 from which arms 132 extend inwardly and are formed down into rails 133 which lie over the sprocket apertures 17 of the film. As these rails are narrow rounded members, substantially all the film width is exposed to the light beam 16. These rails, as shown in Figures 4 and 5 press narrow areas of the film against a plate 111 which is provided with an off-set aperture 113, see Figure 4, and which has raised side edges 112 contacting with the film, thus, as is customary in motion picture apparatus, the film does not touch the major part of plate 111 but only the edges at 112 and it is against these edges that the film F is pressed by the rails 133.

As will be readily understood from the above description, it is not particularly important what type of film gate is used, so long as a portion of the film extending across the entire width thereof is exposed to the beam of light which is used for projecting the pictures. This insures that the entire width of the fim is at somewheres near the same temperature and prevents buckling and swelling of portions of the film which makes reproduction of the record thereon difficult, if not impossible.

It should be noted that the present invention is applicable to the projection of an unsymmetrically located exposure area on a film, the remainder of the film at the gate including rows of perforations and one or more sound records.

It is particularly useful where sound records are used on the film since weaving of the film from one side to another is prevented and which otherwise is liable to produce extremely unsatisfactory results in reproducing sound. Moreover, if the sound record should warp away from the aperture over which it is drawn in reproducing the sound, extremely poor sound reproduction would result.

While it is evident that a large variety of forms of film gate may be used in accordance with my invention, I have shown and described with regard to Figure 1 a preferred form, since with the projector shown in this figure an even width of the film extending entirely across the film is subjected to the light beam which is used for projecting. The film is therefore perfectly evenly heated throughout its width and buckling or swelling is prevented. However, where substantially all of the film is subjected to the light beam, as in the last three figures, entirely satisfactory results may be obtained.

When I refer in the claims to the film receiving substantially even illumination throughout its width I mean to include all film gates which obstruct so little of the light beam that even heating of the film throughout its width results and buckling, due to one portion of the film becoming much warmer than an adjacent portion, is prevented.

Having thus described my invention, what I declare as new and desire to secure by Letters Patent of the United States is:

1. In a projection film gate adapted to receive film with picture areas unsymmetrically positioned thereon and adapted to avoid the deleterious effect on the film of the heat from the light for projection, the combination with a gate member provided with an aperture unsymmetrically located and adapted to register with the picture areas, of a second gate member provided with an opening adapted to expose the entire width of the film adjacent said aperture to the light for projection.

2. In a projection film gate adapted to receive film with picture areas unsymmetrically positioned thereon and adapted to avoid the deleterious effect on the film of the heat from the light for projection, the combination with a gate member provided with an aperture unsymmetrically located and adapted to register with the picture areas, of a second gate member adapted to maintain the film in surface contact with the first mentioned gate member and provided with an opening adapted to expose substantially the entire width of the film adjacent said aperture to the light for projection.

3. In a projection film gate adapted to receive film with picture areas unsymmetrically positioned thereon and adapted to avoid the deleterious effect on the film of the heat from the light for projection, the combination with a gate member provided with a rectangular aperture centrally displaced with respect to the film and adapted to register with the picture areas, of a second gate member adapted slidably to engage one surface of the film and provided with an opening adapted to expose the entire width of said surface of the film adjacent said aperture to the light for projection.

4. In a projection film gate adapted to receive film with picture areas unsymmetrically positioned thereon and adapted to avoid the deleterious effect on the film of the heat from the light for projection, the combination with a gate member provided with an aperture centrally displaced with respect to the film and adapted to register with the picture areas on the film, of a second gate member provided with an aperture at least as wide as said film and having parallel edges extending transversely of the film adjacent the first mentioned aperture, said edges being spaced apart at least the distance of the height of a picture area.

5. In a motion picture apparatus, the combination with a source of light and an optical system including means for projecting a beam of light, of a film gate having two members adapted to guide film therebetween for the projection of picture areas unsymmetrically positioned thereon, one gate member being provided with an aperture unsymmetrically located and adapted to register with the picture areas of the film and the second gate member facing the light source and adapted to engage one side of the film and expose the entire width of the film adjacent said aperture to said light source.

6. In a motion picture apparatus, the combination with a source of light and an optical system including means for projecting a beam of light, of a film gate having two members adapted to guide film therebetween for the projection of picture areas unsymmetrically positioned there on, one gate member being provided with an aperture unsymmetrically located and adapted to register with the picture areas of the film and a second gate member facing the light source and adapted to maintain the film in surface contact with the first mentioned gate member and adapted to expose substantially the entire width of film adjacent said aperture to said light source.

7. In a motion picture apparatus, the combination with a source of light and an optical system including means for projecting a beam of light, of a film gate having two members adapted to guide film therebetween for the projection of picture areas unsymmetrically positioned thereon, one gate member provided with an aperture centrally displaced with respect to the film and adapted to register with the picture areas on the film and a second gate member provided with an aperture at least as wide as said film and having parallel edges extending transversely of the film adjacent the first mentioned aperture and spaced apart by at least the distance of the height of an exposure area.

ALBERT F. SULZER.